Oct. 6, 1953     E. B. NEFF     2,654,129
METHOD OF AND APPARATUS FOR WELDING
Filed May 7, 1949     3 Sheets-Sheet 1
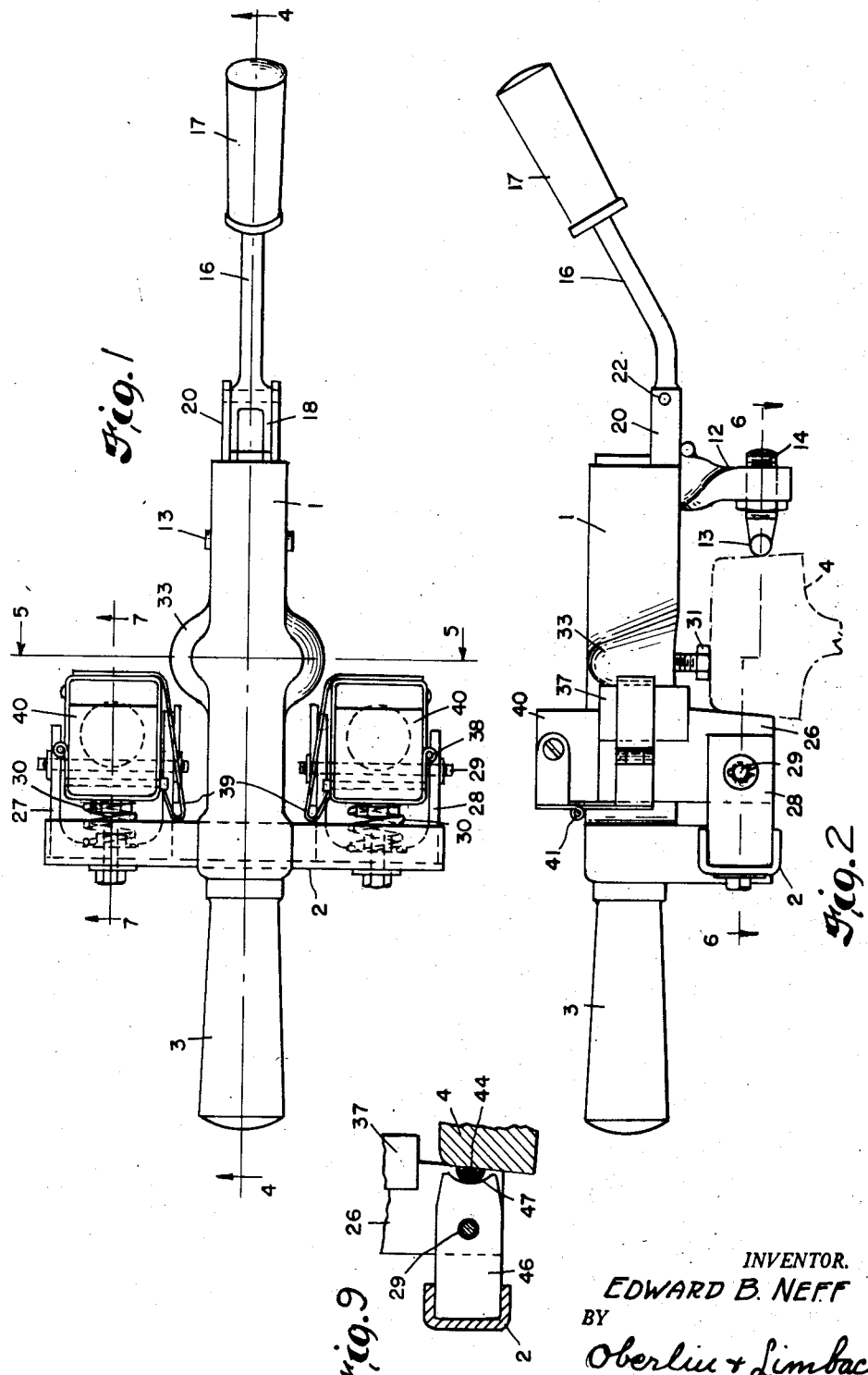
INVENTOR.
EDWARD B. NEFF
BY
Oberlin + Limbach
ATTORNEYS.

Oct. 6, 1953 E. B. NEFF 2,654,129
METHOD OF AND APPARATUS FOR WELDING
Filed May 7, 1949 3 Sheets-Sheet 2
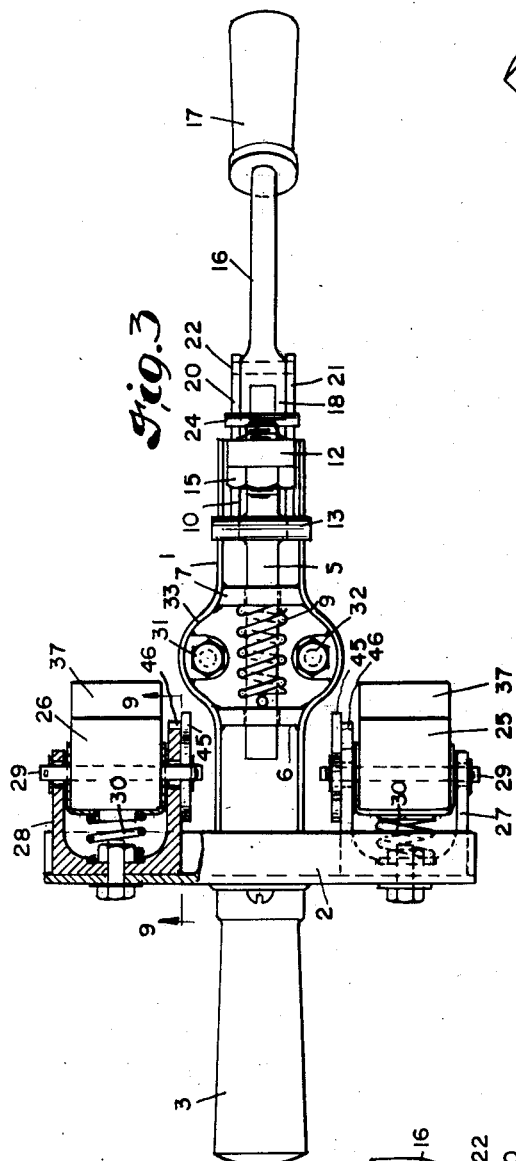
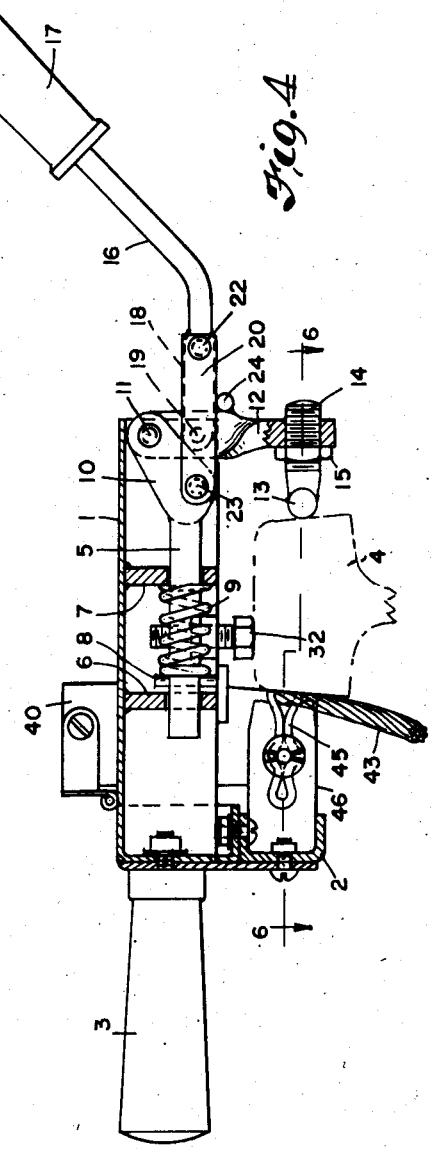
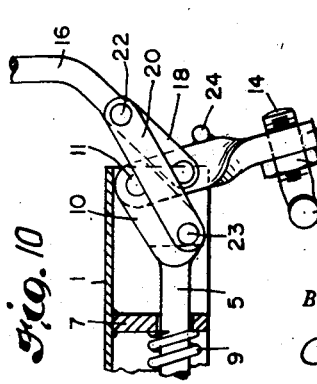
INVENTOR.
EDWARD B. NEFF
BY
Oberlin & Limbach
ATTORNEYS.

Oct. 6, 1953  E. B. NEFF  2,654,129
METHOD OF AND APPARATUS FOR WELDING
Filed May 7, 1949  3 Sheets-Sheet 3

INVENTOR.
EDWARD B. NEFF
BY
Oberlin + Limbach
ATTORNEYS

Patented Oct. 6, 1953

2,654,129

UNITED STATES PATENT OFFICE 2,654,129

METHOD OF AND APPARATUS FOR WELDING

Edward B. Neff, Shaker Heights, Ohio, assignor to Erico Products, Inc., Cleveland, Ohio, a corporation of Ohio Application May 7, 1949, Serial No. 92,067

10 Claims. (Cl. 22—116)

This invention relates as indicated to a novel method and apparatus for welding and, more particularly, to a method and apparatus especially adapted for the attachment of rail bonds and the like to steel rails.

In Patent No. 2,229,045 of Charles A. Cadwell, there is disclosed a welding material adapted for use in an exothermic reaction comprising a mixture of copper oxide and a crushed copper aluminum alloy which, when ignited, will produce a charge of molten copper suitable for immediate use in the welding of a copper or copper alloy rail bond to a steel rail or the like. Patent No. 2,277,014 to Noble G. Carlson discloses a form of rail bonding apparatus particularly suited for use with the aforesaid welding material in the attachment of rail bonds to rails, such apparatus comprising two spaced mold blocks and common clamping means therefor adapted to clamp the same against the side of a rail head. Such welding material and apparatus have enjoyed great commercial success for the past several years.

Due to the fact that only a relatively small charge of molten copper is ordinarily employed for the purpose of forming the bond terminal, it is necessary that such charge of molten copper be at a relatively high temperature when it enters the mold cavity. Since the signal bond, for example, which is to be attached to the rail head has a high thermal conductivity, a portion of the same extending from the mold cavity tends to become highly heated with a resultant embrittling effect. The breaking of a rail bond is a serious nuisance, halting all traffic on the length of track affected, so that it is obvious that such embrittling effect and consequent weakness in the bond at this point should be prevented if in any way possible. It has become a common practice to crimp a metal sleeve about the end portions of the bond prior to attaching the latter to the rail head so that a portion of such sleeve will project from the weld and to some extent support and protect the stranded conductor at this point. In practice, however, such protection has proven to be only partial. The effect of the overheating of the end portions of the bond protruding from the weld terminals is readily discernible by the discoloration which takes place in these regions.

Some difficulty has also been encountered with the various types of mold clamping devices employed in the past due to the difficulty in obtaining proper register of the faces of the mold blocks against the side of the rail head. Such register is obviously of considerable importance inasmuch as it is the side of the rail head which forms one wall of the mold cavity during the welding operation and a tight fit is essential to insure proper positioning of the end of the rail bond in the cavity and to prevent escape of any of the weld metal therefrom. Since such mold blocks are customarily of graphite, excessive clamping pressures may not be imposed thereon without causing danger to the same.

It is, therefore, a primary object of my invention to provide a novel welding apparatus and method of welding whereby a rail bond may be welded to a steel rail or the like without danger to such bond by overheating adjacent the welded terminals.

Another object of my invention is to provide novel bonding apparatus including two spaced mold blocks adapted to receive the ends of the bond during the welding operation, such apparatus including clamping and mounting means for such blocks causing the latter to be firmly and properly positioned against the side of the rail head without the imposition of excessive pressures thereon.

Another object of my invention is to provide a novel rail bond particularly adapted for use in conjunction with the aforesaid apparatus.

Other objects of my invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing—

Fig. 1 is a top plan view of one embodiment of my new bonding apparatus;

Fig. 2 is a side elevational view of such apparatus;

Fig. 3 is a bottom plan view of the apparatus with a portion of one mold support partly broken away to better show the construction thereof;

Fig. 4 is a vertical sectional view through such apparatus taken along the line 4—4 on Fig. 1;

Fig. 9 is a fragmentary sectional view taken along the line 9—9 on Fig. 3; and

Fig. 10 is a fragmentary view similar to Fig. 4 but showing the toggle clamping mechanism in unlocked position.

Figure 5:
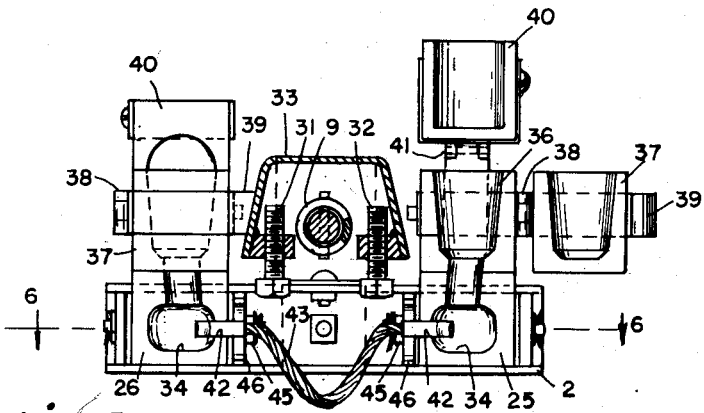
Fig. 5 is a vertical sectional view taken through such apparatus along the line 5—5 on Fig. 1 and showing one of the mold block assemblies opened out to facilitate removal of slag and other residue from the exothermic reaction crucible.

Referring now more specifically to said drawing, the embodiment of my invention there illustrated comprises a main frame consisting of a downwardly opening channel member 1 carrying a transverse channel frame member 2 thereabeneath. A handle 3 extends from the end of main frame member 1 by which the apparatus is adapted to be lifted and placed upon a rail head 4.

A toggle clamping mechanism is mounted in the other end portion of channel frame member 1 and comprises a plunger 5 mounted for axial reciprocation in brackets 6 and 7 within channel frame member 1. As best shown in Figs. 3 and 4, movement of such plunger toward handle 3 is limited by stop pin 8 and movement in the opposite direction is resiliently resisted by compression spring 9 bearing against such pin and bracket 7. A bifurcated clevis 10 is affixed to the outer end of plunger 5 and extends upwardly therefrom at an angle. Pivotally mounted between the ends of such clevis at 11 is a downwardly extending lever member 12 having a rail-engaging shoe 13. Such shoe is secured to the end of member 12 by a threaded stud 14 and a lock nut 15 whereby a fairly delicate adjustment of such shoe is possible. A clamp operating lever 16 provided with a handle 17 terminates in a clevis 18 pivotally connected to member 12 at 19. A pair of links 20 and 21 pivotally connect lever 16 at 22 with the end of plunger 5 at 23, and a stop 24 welded to member 12 limits downward movement of clevis 18 and the links 20 and 21.

Figs. 2, 3 and 4 show the above-described toggle clamping mechanism in locked position to secure the apparatus on the rail head. Fig. 10 shows the toggle mechanism in unclamped position. It will be seen that, when clamping lever 16 is moved upwardly as shown in Fig. 10, member 12 is swung outwardly about pivot 11, thereby moving shoe 13 outwardly away from the rail head. When clamping lever 16 is moved downwardly, shoe 13 will be moved to the left into clamping position and links 20 and 21 will lie parallel to clevis 18 locking lever 12 and its shoe 13 in such clamping position. The pressure of shoe 13 against the side of the rail head is determined not only by adjustment of stud 14 but also by the strength of compression spring 9 which resists outward movement of plunger 5 to which the entire aforesaid toggle clamping mechanism is affixed.

Figure 6:
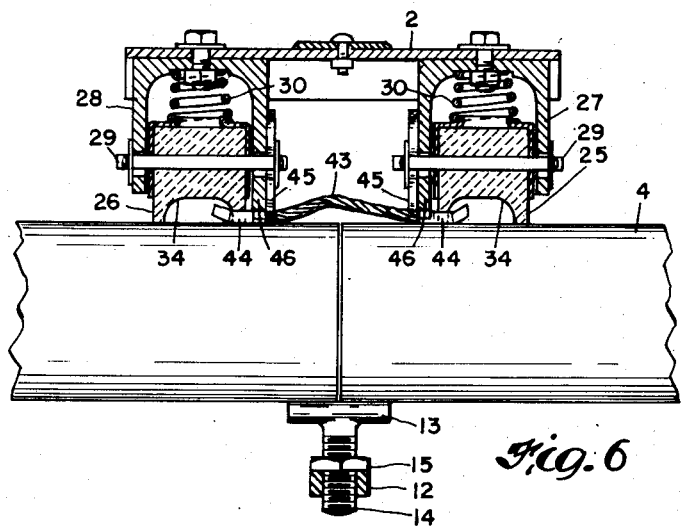
Fig. 6 is a sectional view taken on a horizontal plane along the line 6—6 on Figs. 2, 4 and 5.
Figures 7, 8:
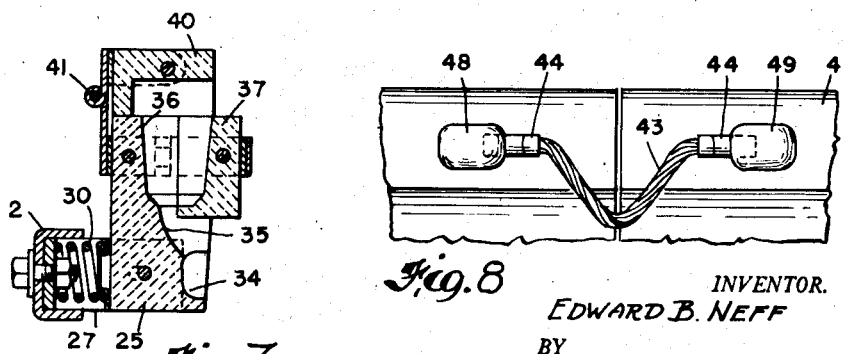
Fig. 7 is a vertical sectional view through one mold block assembly taken along the line 7—7 on Fig. 1.
Fig. 8 is an elevational view of a rail head showing a signal bond welded thereto.

Referring now more particularly to Figs. 5, 6 and 7 of the drawing, it will be seen that a pair of mold blocks 25 and 26, ordinarily of graphite, are carried in clevises 27 and 28 respectively bolted to transverse frame member 2. Such mold blocks are mounted in their respective clevises by means of pins 29 having a relatively loose fit in such clevises so that the mold blocks are permitted not only pivotal but also a certain degree of in-and-out movement. Compression springs 30 are interposed between the backs of the mold blocks and their respective clevises to urge such blocks inwardly toward the rail head 4 and also resiliently to resist pivotal movement of the blocks. It will thus be seen that, when the faces of the mold blocks are drawn against the side of the rail head through the action of the above-described toggle clamping means, such mold blocks are adapted to independently accommodate themselves to the usually somewhat sloping side of the rail head and are also permitted slight individual adjustment to the rail head in a horizontal plane.

The vertical positioning of the mold blocks is determined by a pair of adjustable screws 31 and 32 threadedly mounted in an expanded portion 33 of channel member 1. As best shown in Fig. 4, such screws may be turned to adjust the vertical position of the apparatus on the rail head.

block assemblies (which are mirror images of one

As best shown in Figs. 5 and 7, the two mold block assemblies (which are mirror images of one another) include mold cavities 34 communicating by way of sprues 35 with upper crucibles 36. Each crucible portion is vertically divided into two halves, the half portions 37 (on the rail side) being hingedly attached to the mold block proper at 38 and adapted to be secured in closed position by means of spring catches 39. A semi-cylindrical graphite cover member 40 opening toward the rail when resting upon the top of the mold block is hingedly secured to the latter at 41 to permit the same to be swung back as shown in Fig. 5 to facilitate access to the crucible for cleaning purposes. When in lowered position as shown in Fig. 7, such covers serve to direct any flame or spatter from the exothermic reaction in a direction away from the operator.

Lateral passages 42 of semi-circular cross-section open toward one another from the respective mold cavities 34 and are adapted to receive the sleeved end portions of a stranded conductor 43 with the ends of such conductor respectively extending into such mold cavities. Such conductors will ordinarily be of copper or copper alloy and the sleeves 44 will be of like material. As best shown in Fig. 6, the end portions of the bond extending within the mold cavities will desirably be slightly upturned to permit the molten weld metal to surround the same. The remainder of the sleeve, however, extending through passages 42 and beyond will be crimped to semi-circular cross-section (Fig. 9) so that such portion of the sleeve may be held in close contact with the side of the rail head 4. A spring clamp 45 is mounted on the side of each of the adjacent arms 46 of the two mold block supporting clevises 27 and 28 in position to grip bond 43 adjacent the ends of sleeves 44 so that a bond may thus be preliminarily secured with its ends in the respective mold cavities prior to mounting the apparatus upon the rail head. This considerably expedites the bonding operation.

Further referring to Fig. 9, it will be noted that the ends of clevis arms 46 terminate in an arcuate recess 47 adapted to engage and bear against sleeves 44 of bond 43 to press the same tightly against the side of rail head 4. Consequently, when a bond is positioned as shown in Fig. 5 and the apparatus mounted upon a rail head as shown in Fig. 4, the clamping pressure will be exerted at three points, namely shoe 13 on one side of the rail head and the two spaced clevis arms 46 bearing against the sleeved ends of conductor 43 on the other side of the rail head. Mold blocks 25 and 26 being resiliently mounted as above explained readily accommodate themselves to the side of the rail head but have no very great pressures imposed thereon since they are resiliently backed by relatively weak compression springs 30. A sufficiently tight seal of the respective mold cavities against the side of the rail head is therefore obtained without danger of damage to the relatively fragile graphite mold blocks.

When metal-producing exothermic reaction material such as that disclosed in Cadwell Patent No. 2,229,045 is placed in crucibles 36, after first closing sprue 35 with a thin metal disc, and then ignited, the molten weld metal produced melts through such discs and descends into the mold cavities where it surrounds the upturned ends of stranded bond 43 and a thoroughly homogeneous weld is obtained with the end of each wire strand and the side of the rail head. The covers 40 will now be lifted and crucible sections 37 will be swung open to facilitate cleaning out any slag or the like which may be desirable before again using the apparatus, thereby allowing a short period in which the cast copper terminal may anneal. The apparatus is then readily removed from the rail head by handle 3 after unclamping bond 43 left secured to the side of the rail head by welded terminals 48 and 49 (Fig. 8). The clevis arms 46 are desirably of manganese bronze but may be of other metal such as steel or copper. There is a relatively small area of contact between curved ends 47 of such clevis arms and bond sleeves 44 and while this serves to conduct some heat from the bond chief reliance is placed upon the large flat sides of such sleeves which are firmly pressed against the side of the rail head. Compression spring 9 is sufficiently powerful when stud 14 is appropriately adjusted to cause a very heavy clamping pressure to be exerted by the toggle clamp which may, for example, amount to 70–80 pounds per square inch or more on each sleeved bond terminal. As a result of the large area of contact and heavy pressure exerted the steel rail is caused to take up sufficient heat from those portions of the bond protruding from the welds to prevent overheating and consequent damage thereto. The resultant bonds are of consistent superiority and have much longer life expectancy than in the past. As above explained, the imposition of such heavy pressures on the bond is obtained without any undue pressure on the relatively fragile graphite mold blocks which are substantially free-floating in their mounts.

The curved recesses 47 at the ends of arms 46 are fairly shallow so that such clevis arms will not themselves directly contact the side of rail head 4 (Fig. 9) but will accommodate some degree of alteration in the positions of the bonds.

The type of bond preferably employed with my novel apparatus should have relatively long copper sleeves crimped on the end portions thereof, having long flat faces adapted to contact the side of the rail head not only in the region of mold passages 42 but also outside the latter where engaged by chill clevis arms 46. The extreme ends will desirably be upturned, as shown, to permit molten metal to surround the same within the mold cavity.

If it be found that the bond or other conductor shows discoloration adjacent the welds, the clamping pressure will be increased until such effect is no longer noted.

It will be seen that I have provided novel cast welding apparatus wherein the respective graphite mold blocks are resiliently urged against the side of the rail with much less pressure than that imposed on the bond itself in the regions closely adjacent such molds. Consequently, there is no danger of damaging the graphite mold blocks by excessive pressures thereon but sufficiently close contact of bond and rail are obtained adjacent thereto to ensure substantial heat transfer from bond to rail with resultant prevention of heat discoloration and embrittlement. It will be appreciated by those skilled in the art that metal articles other than copper rail bonds and steel rails may be welded together in accordance with this invention, and by "copper" as used herein and in the claims it is intended to include those copper alloys commonly employed in bonds and conductors. Thus, the apparatus and method of my invention may be employed in the welding of electrical conductors to pipe-lines and the like as well as to steel rails.

Other modes of applying the principle of the invention may be employed, change being made as regards the details described, provided the features stated in any of the following claims or the equivalent of such be employed.

I therefore particularly point out and distinctly claim as my invention:

1. In rail bonding apparatus of the character described, the combination of a supporting frame adapted to rest upon a rail head, a pair of laterally spaced graphite mold blocks carried by said frame for engagement with a side of such rail head, a clevis for each said mold block secured to said frame and mounting said respective blocks for pivotal movement about an axis parallel to such rail to permit automatic adjustment to the slope of the side of the rail head engaged thereby, such pivotal mountings having a degree of play therein to permit movement of said blocks toward and away from such rail, means engaging said mold blocks adapted resiliently to urge said mold blocks toward such rail, mold cavities in the respective rail-contacting faces of said graphite mold blocks, a passage in the rail-contacting face of each said block leading from said cavities to the opposed faces of said respective blocks and adapted to closely fit the sleeved end portions of a stranded rail bond with the ends of the latter extending into said cavities, a spring clip on each adjacent clevis arm of said respective mold block-supporting clevises adapted to grip such rail bond to hold the same in proper position during placement of said apparatus on the rail head, such adjacent clevis arms having concave ends extending sufficiently to engage such sleeved portions of such bond, and said resilient means permitting movement of said blocks rearwardly into their respective clevises so that the only members adapted to bear rigidly against such bond are said adjacent clevis arms, and a toggle clamp on said frame including an adjustable shoe adapted to engage the opposite side of such rail head to that engaged by said mold blocks and such bond, and a powerful spring adapted to exert a strong clamping pressure when said toggle clamp is operated to draw such adjacent clevis arms strongly and rigidly against such bond and said mold blocks resiliently against such rail head.

2. In rail bonding apparatus of the character described, the combination of a supporting frame adapted to rest upon a rail head, a pair of laterally spaced mold blocks carried by said frame for engagement with a side of such rail head, means resiliently supporting said mold blocks for individual adjustment to such side of said rail head, said blocks having mold cavities in their respective rail-contacting faces and passages in such faces leading from such cavities to the opposed faces of said blocks adapted to closely fit a rail bond held therein with the ends of such bond extending into such respective cavities, rigid frame members extending alongside said respective mold blocks adapted to engage the side of such bond opposite from the side toward such rail head where such bond emerges from such passages, and adjustable clamping means on said frame operative to engage the side of such rail head opposite to that engaged by said mold blocks and such bond to draw said rigid frame members toward such rail head and thereby force the portions of such bond engaged by said members against such rail with said mold blocks resiliently and less forcibly engaging such rail.

3. In rail bonding apparatus, a mold supporting frame, a pair of laterally spaced molds resiliently supported thereby for engagement with the side of a rail head, said molds having mold cavities in the rail-engaging faces thereof and passages in such faces leading from such cavities to the opposed faces of said molds adapted to closely fit a rail bond held therein with the ends of such bond extending into such respective cavities, members on said frame extending alongside said respective molds in a direction generally normal to the side of such rail head and adapted to engage such bond closely adjacent the latter's points of emergence from said respective passages, and clamping means operative to clamp said frame on such rail head with said frame members forcibly pressing such bond against such rail, such resilient supporting means for said molds being adapted to hold said molds less forcibly thereagainst.

4. In rail bonding apparatus, a mold supporting frame, a mold supported thereby for engagement with the side of a rail, said mold having a mold cavity in its rail-contacting face adapted to receive the end of a bond with such bond extending laterally therefrom, a frame member adapted to bear against such bond adjacent the point of the latter's emergence from such mold and opposite to the rail-contacting side of such bond, said mold being mounted for movement toward and away from such rail relative to said frame member, and clamping means operative to press said frame member forcibly against such bond.

5. In cast welding apparatus, a mold supporting frame, a mold supported thereby having a mold cavity in one face adapted to be presented to a surface of one member to be welded, with another member to be welded thereto lying partly in such cavity and partly extending laterally therefrom against such surface of such first member, means carried by said frame adapted resiliently to urge said mold toward said first member, and independently mounted pressure means carried by said frame adapted resiliently to engage and press such second member against such first member in the region closely adjacent said mold with a force much greater thant the force with which said mold is adapted thus to be urged toward said first member.

6. The method of attaching a copper rail bond to a steel rail which comprises inserting the ends of such bond in respective graphite mold cavities, holding the open faces of such mold cavities against such rail, and delivering a charge of highly heated molten copper to such cavities to form cast welded terminals while simultaneously pressing such bond against such rail in the regions closely adjacent such terminals with a pressure much greater than that applied in holding such graphite molds against such rail and sufficient to ensure substantial heat transfer from such bond to such rail in such regions and thereby substantially prevent heat discoloration and embrittlement of such bond in such regions.

7. In combination, rail bonding apparatus comprising a mold supporting frame, a pair of laterally spaced molds resiliently supported thereby for engagement with the side of a rail head, said molds having cavities in the rail-engaging faces thereof and passages in such faces leading from such cavities to the opposed faces of said molds adapted closely to fit a rail bond held therein with the ends of such bond extending into such respective cavities, pressure members on said frame extending alongside said respective molds in a direction generally normal to the side of such rail head and adapted to engage such bond closely adjacent the latter's points of emergence from said respective passages, clamping means operative to clamp said frame on such rail head with said members forcibly pressing such bond against such rail and said molds resiliently and less forcibly thereagainst, spring clip means adapted to grip such bond and hold the same in proper position in such passages during placement of said apparatus on the rail head, and a stranded rail bond thus held by said clips, said bond having a copper sleeve crimped on each end portion thereof extending from within such respective mold cavities to and including the points of engagement by said pressure members, and such sleeves having flat rail-contacting faces in the regions of said mold passages and pressure members to ensure close contact with such rail over a substantial area in such regions.

8. In combination, rail bonding apparatus comprising a mold supporting frame, a pair of laterally spaced molds resiliently supported thereby for engagement with a rail, said molds having cavities in the rail-engaging faces thereof and passages in such faces leading from such cavities to the opposed faces of said molds adapted closely to fit a rail bond held therein with the ends of such bond extending into such respective cavities, a bond thus positioned having a tightly fitting metal sleeve on each end portion thereof extending through such passages and for a distance therebeyond, pressure members carried by said frame disposed to bear against such respective sleeved portions of said bond closely adjacent said molds, such sleeves having flat rail-contacting faces in the regions engaged by said members, and clamping means operative to urge said members strongly against such sleeves to press the latter forcibly against such rail.

9. In bonding apparatus for cast welding a bond to a larger metal member comprising a mold having a cavity in a face adapted to engage such member, a passage in such mold face leading from such cavity to the exterior of said mold and adapted closely to fit a bond held therein with an end extending into such cavity; a bond thus positioned having a tightly fitting metal sleeve on such end portion extending through such passage and for a distance therebeyond, said sleeve being proportioned to fit snugly in such passage and against such larger member, pressure means arranged to bear against such sleeved portion of said bond closely adjacent said mold, such sleeve having a flat face adapted to contact such member in the region engaged by said pressure means, a frame, mold supporting means on said frame adapted thus to hold said mold firmly but yieldably in engagement with said member, and clamping means on said frame operative to urge said pressure means against such sleeve to press the latter forcibly against such member with a force greater than that thus holding said mold against such larger member.

10. In cast welding apparatus, a mold having a mold cavity in one face adapted to be presented to a surface of one member to be welded, such cavity also being adapted to receive a second member to be welded with a portion of such second member extending laterally therefrom in contact with such surface, a supporting frame for said mold, pressure means also carried by said frame adapted to engage such second member to press the same forcibly against such first member in the region closely adjacent said mold, clamping means operative to force said pressure means against such second member, and means mounting said mold on said frame for movement relative to said pressure means to permit said mold to bear against such second member less forcibly than said pressure means.

EDWARD B. NEFF.

References Cited in the file of this patent

UNITED STATES PATENTS

| Number | Name | Date |
|---|---|---|
| 1,581,455 | Lincoln | Apr. 20, 1926 |
| 2,262,755 | Cadwell | Nov. 18, 1941 |
| 2,276,823 | Cadwell | Mar. 17, 1942 |
| 2,277,014 | Carlson | Mar. 17, 1942 |
| 2,318,604 | Febrey | May 11, 1943 |
| 2,368,295 | Goran | Jan. 30, 1945 |
| 2,401,048 | Cadwell | May 28, 1946 |
| 2,430,188 | Sargent | Nov. 4, 1947 |
| 2,463,065 | Stevenson | Mar. 1, 1949 |

FOREIGN PATENTS

| Number | Country | Date |
|---|---|---|
| 616,239 | Great Britain | Jan. 18, 1949 |